Jan. 24, 1967    N. P. NIES ET AL    3,300,278
CRYSTALLINE SODIUM METABORATE TETRAHYDRATE AND
PROCESS FOR PRODUCTION THEREOF
Filed Jan. 30, 1963
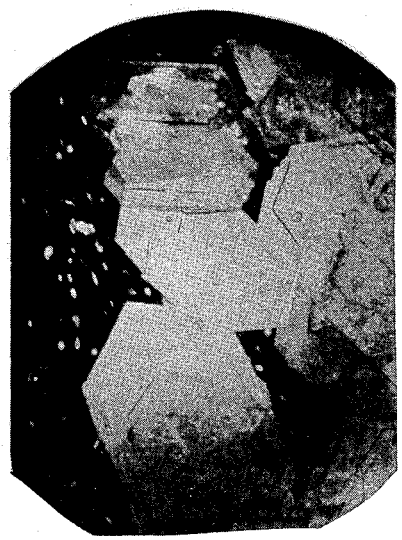
NELSON P. NIES
PAUL F. JACOBS
INVENTORS.
BY James R. Thornton
AGENT.

United States Patent Office 3,300,278
Patented Jan. 24, 1967

3,300,278
CRYSTALLINE SODIUM METABORATE TETRAHYDRATE AND PROCESS FOR PRODUCTION THEREOF
Nelson P. Nies, Laguna Beach, and Paul F. Jacobs, Orange, Calif., assignors to United States Borax & Chemical Corporation, Los Angeles, Calif., a corporation of Nevada
Filed Jan. 30, 1963, Ser. No. 255,428
11 Claims. (Cl. 23—59)

This invention relates to crystalline sodium metaborate tetrahydrate, and more particularly, to a process for producing a high purity sodium metaborate tetrahydrate in a new crystalline form which can be readily isolated.

Sodium metaborate, $Na_2B_2O_4$, finds use in the manufacture of photographic chemical formulations. The metaborate normally exists in two hydrated forms $Na_2B_2O_4 \cdot 4H_2O$ and $Na_2B_2O_4 \cdot 8H_2O$, but the tetrahydrate ($Na_2B_2O_4 \cdot 4H_2O$) is the presently preferred form for some photographic formulations. It has been proposed in the art to prepare hydrated sodium metaborate by the reaction of two moles of sodium hydroxide with sodium tetraborate in the presence of that amount of water necessary to give the hydrated material desired. However, this procedure gives a product which does not meet the purity standards desired for photographic formulations.

It is, therefore, an object of this invention to provide high purity crystalline sodium metaborate tetrahydrate.

It is also an object of this invention to provide a process for producing pure crystalline sodium metaborate tetrahydrate in a form which can be readily isolated.

It is a further object of this invention to provide a continuous process for producing pure, crystalline sodium metaborate tetrahydrate.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The attached photograph is a photomicrograph of the crystalline sodium metaborate tetrahydrate of this invention.

Broadly stated, this invention provides the process for producing crystalline sodium metaborate tetrahydrate which comprises the steps:

(a) Forming an aqueous solution of sodium metaborate containing about from 38 to about 55 percent by weight $Na_2B_2O_4$ by combining in an aqueous medium sodium tetraborate and sodium hydroxide in a molar ratio of about 1:2 and heating the combination to a temperature higher than the temperature at which the solution is substantially saturated with respect to sodium metaborate;

(b) Agitating and cooling the resultant solution to a temperature in the range of from about 54° to about 80° C. and maintaining said agitated solution at a temperature in the range of from about 54° to about 80° C. for at least about 3 days, thereby forming large, plate-like crystals of sodium metaborate tetrahydrate, (c) Separating said crystals from said solution at a temperature in the range of from about 54° to about 80° C., and (d) Drying said crystals to give sodium metaborate tetrahydrate.

The process of the present invention gives excellent yields of large, plate-like crystals of high purity sodium metaborate tetrahydrate which are easily isolated from the reaction medium. Also, by recycling the aqueous medium after separating the crystalline product, the process readily is converted to a continuous process.

In the first step of the process an aqueous solution of sodium metaborate containing about 38 to about 55 percent, and preferably from about 46 to about 52 percent by weight $Na_2B_2O_4$, is formed by combining sodium tetraborate and sodium hydroxide in an aqueous medium and heating the resulting mixture. The reactants are combined in a molar ratio of about two moles of sodium hydroxide to one mole of sodium tetraborate. Any of the readily available forms of sodium tetraborate, commonly known as borax, can be used, as for example, borax containing either five or ten molecules of water of crystallization. The aqueous medium employed can be either water, mother liquor containing dissolved sodium metaborate, or the like. Of course, if a sodium metaborate mother liquor is used, less tetraborate and sodium hydroxide is added to give a solution of the required concentration.

The mixture is heated to a temperature higher than the temperature at which the solution is substantially saturated with respect to sodium metaborate, which generally is at least about 80° C., and preferably above about 90° C. The upper limit is restricted only by the boiling point of the solution, but from a practical standpoint is about 110° C. If any insoluble material is present, it is preferably removed by filtration of the hot solution.

The hot solution is then slowly cooled, with efficient agitation, to a temperature in the range of from about 54° to about 80° C. and maintained at a temperature in this range, but preferably in the range of from about 60° to about 75° C. for at least about 3 days.

Although the length of time required for this crystallization period is limited only by practical operational considerations, a preferred period is for about 6 to about 10 days. Efficient agitation, such as by the usual mechanical stirrer, is maintained during the crystallization period. It is usually desirable to add a small amount of previously prepared sodium metaborate tetrahydrate as seed crystals to aid the crystallization. During the crystallization period, sodium metaborate tetrahydrate forms in the solution as large, plate-like crystals, which appear to have a hexagonal shape and are characterized by the substantial absence of needle-like crystals. A majority of the crystals are about 1 to 2 mm. in length or larger. The attached photomicrograph is of a sample of the slurry after a crystallization period of 7 days. The large size and plate-like habit of the crystals is readily apparent. The small particles in the solution are small crystals which have formed as the solution cools during the preparation and exposure of the photomicrograph.

At the end of the crystallization period the crystals are readily separated from the solution by mechanical means, such as by use of a centrifuge. The large size and plate-like habit of the crystals contribute to their ease of separation. The crystals are then dried to give pure crystalline sodium metaborate tetrahydrate.

In a preferred embodiment of this invention, magnesium oxide (magnesia), preferably as a freshly prepared aqueous slurry, is added to the hot aqueous solution of sodium metaborate prior to the crystallization period. The resulting mixture is stirred at the elevated temperature for at least about 0.2 hour, and preferably for about 0.5 to about one hour, and then removed, such as by filtration, from the hot solution. A filter-aid, such as the usual carbonaceous filter-aid, is preferably used to aid in the filtration step. This procedure removes any iron which is a common impurity in borax and sodium hydroxide, thereby giving a superior photographic grade of sodium metaborate. The amount of magnesium oxide required will depend upon the amount of iron to be removed, but it has been found that the addition of about 0.01 to about 0.05 percent of magnesium oxide, based on the total weight of the sodium metaborate solution, usually is sufficient.

The process is readily adapted to a continuous process by recycling the aqueous mother liquor obtained after separation of the crystals. The mother liquor can be used as the aqueous medium for preparation of additional sodium metaborate. In a continuous process, after the metaborate slurry has been stirred for the crystallization period, another hot solution of sodium metaborate of the same concentration is formed by combining sodium tetraborate and sodium hydroxide in an aqueous medium and this hot solution is added to the slurry of crystals while maintaining the temperature of the slurry at about the same level, by for example, circulating cold water through coils immersed in the slurry. While the hot solution is being added, the slurry of metaborate crystals is removed from the vessel at the same rate so that the slurry level remains substantially constant. The crystals can be removed from the slurry by centrifugation and dried as described above. This procedure can be repeated, thereby giving a continuous process.

The following examples are presented to illustrate the invention, although it is to be understood that the invention is not to be limited to the specific examples.

*Example I*

An aqueous solution (64,300 lbs.) of sodium metaborate containing 45.4 percent by weight $Na_2B_2O_4$ was made up by heating to about 93° C. and mixing together 1800 gallons of water, 1390 gallons of 50% aqueous sodium hydroxide solution containing about 17 p.p.m. iron and 31,600 lbs. of sodium tetraborate pentahydrate containing about 15 p.p.m. iron. Fifteen pounds of chemical grade magnesia were then stirred with four gallons of water and added to the solution. The mixture was stirred for 0.5 hour after addition of the magnesia, and then filtered, using Nuchar KPC (a carbonaceous filter-aid) as a filter precoat, into a tank provided with cooling coils and an agitator. The filtrate was cooled to 78° C. with agitation and 90 lbs. of previously prepared crystalline $Na_2B_2O_4 \cdot 4H_2O$ was added for seed. The mixture was allowed to cool with stirring to 54° C., forming a slurry of small crystals which were thin flakes, and the temperature of the slurry was maintained between 54° and 58° C. for 7 days with agitation. During this period the flake crystals in the slurry grew to sizes up to 2 mm. in length. Water was added as necessary, to keep the overall concentration equal to about 45.4 percent $Na_2B_2O_4$. Another 64,300 lb. batch of hot solution having 45.4 percent $Na_2B_2O_4$ was then made up, treated with magnesia and filtered in the same way as the first batch. This hot strong liquor was added gradually to the stirred slurry of $Na_2B_2O_4 \cdot 4H_2O$ crystals, while cooling water was passed through the coils to keep the temperature of the slurry from rising above 58° C. At the same time, the crystalline slurry was removed from the bottom of the vessel at approximately the same rate as the addition of the hot liquor, so that the slurry level remained approximately constant. The crystalline slurry was transferred to a centrifuge for isolation of the crystals. Centrifugation was continued during the addition of the batch of concentrated liquor which was complete in four hours. The crystals from the centrifuge, after passing through a rotary dryer, weighed 8 tons and analyzed

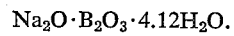

$Na_2O \cdot B_2O_3 \cdot 4.12H_2O.$

On each of the succeeding days another batch of hot solution of the same composition was made up from sodium tetraborate, aqueous sodium hydroxide and mother liquor from the previous day's operation, treated with magnesia and filtered as before. Each batch was added to the slurry using cooling water and centrifuging simultaneously as before. The yield was 8 tons of crystals per batch. The iron content of the crystalline product was approximately 1 p.p.m.

*Example II*

The procedure of Example I was repeated except that the hot solution (67,000 lbs.) was made up by combining in 1660 gallons of water, 1500 gallons of 50 percent NaOH solution and 34,100 lbs. of sodium tetraborate pentahydrate to give a concentration of 46.8 percent $Na_2B_2O_4$. On the second and successive days of centrifugation, the hot liquor, 67,000 lbs. per batch, was made from mother liquor rather than from water, with calculated amounts of NaOH solution and sodium tetraborate pentahydrate. About 10 tons of crystalline sodium metaborate tetrahydrate was obtained per batch.

*Example III*

An aqueous solution (2410 grams) containing 52.5% $Na_2B_2O_4$ was prepared, stirred and heated to 100° C., cooled to 94° C. and seeded with three grams of crystalline $Na_2B_2O_4 \cdot 4H_2O$. The temperature was gradually decreased over a period of several hours, with continuous stirring, to 72° C. and the slurry then stirred at 72°–74° C. for 6 days. The plate-like crystals, a majority of which were more than 1 mm. in length, were separated by centrifugation. After drying their weight was 1027 grams.

Other modes of applying the principle of the invention may be employed, change being made as regards the details described, provided the features stated in any of the following claims or the equivalents of such be employed.

We, therefore, particularly point out and distinctly claim as our invention:

1. Crystalline sodium metaborate tetrahydrate, said crystals being characterized by a plate-like habit and hexagonal shape, a majority of which are at least about 1 mm. in length, and being substantially free from needle-like crystals.

2. The process for producing crystalline sodium metaborate tetrahydrate which comprises the steps:
   (a) forming an aqueous solution of sodium metaborate containing from about 38 to about 55 percent by weight $Na_2B_2O_4$ by combining in an aqueous medium sodium tetraborate and sodium hydroxide in a molar ratio of about 1:2 and heating the combination to a temperature of from at least about 80° C. to the boiling point of said solution,
   (b) agitating and cooling the resultant solution to a temperature in the range of from about 54° to about 80° C., and maintaining said agitated solution at a temperature in the range of from about 54° to about 80° C. for at least about 3 days, thereby forming large, plate-like crystals of sodium metaborate tetrahydrate,
   (c) separating said crystals from said solution at a temperature in the range of from about 54° to about 80° C., and
   (d) drying said crystals to give sodium metaborate tetrahydrate.

3. The process according to claim 2, wherein said agitated solution is maintained at a temperature in the range of from about 60° to about 75° C. for about 6 to about 10 days.

4. The process according to claim 2, wherein said aqueous solution of sodium metaborate contains from about 46 to about 52 percent by weight $Na_2B_2O_4$.

5. The process for producing crystalline sodium metaborate tetrahydate which comprises the steps:
   (a) forming an aqueous solution of sodium metaborate containing from about 38 to about 55 percent by weight $Na_2B_2O_4$ by combining in an aqueous medium sodium tetraborate and sodium hydroxide in a molar ratio of about 1:2 and heating the combination to a temperature of from at least about 80° C. to the boiling point of said solution, (b) adding magnesium oxide to the solution and stirring the resultant hot mixture for at least about 0.2 hour, (c) filtering said hot mixture to remove insoluble material, (d) stirring and cooling the filtrate to a temperature in the range of from about 54° to about 80° C. and maintaining said stirred solution at from about 54° to about 80° C. for at least about 3 days, thereby forming large, plate-like crystals of sodium metaborate tetrahydrate, (e) separating said crystals from said solution by centrifugation at a temperature of from about 54° to about 80° C., and (f) drying said crystals to give sodium metaborate tetrahydrate.

6. The process according to claim 5, wherein said aqueous solution of sodium metaborate contains from about 46 to about 52 percent by weight $Na_2B_2O_4$.

7. The process according to claim 5, wherein said agitated solution is maintained at a temperature in the range of from about 60° to about 75° C. for about 6 to about 10 days.

8. The process according to claim 5, wherein said hot mixture containing magnesium oxide is stirred for about 0.5 to 1 hour.

9. The continuous process for producing crystalline sodium metaborate tetrahydrate which comprises the steps:

(a) forming an aqueous solution of sodium metaborate containing from about 38 to about 55 percent by weight $Na_2B_2O_4$ by combining in an aqueous medium sodium tetraborate and sodium hydroxide in a molar ratio of about 1:2 and heating the combination to a temperature in the range of from about 90° C. to the boiling point of said solution.

(b) adding a freshly prepared aqueous slurry of magnesium oxide to the solution and stirring the resultant hot mixture for about 0.5 to 1 hour, (c) filtering said hot mixture to remove insoluble material, (d) stirring and slowly cooling the filtrate to a temperature in the range of from about 54° to about 80° C. and maintaining said stirred solution at from about 54° to about 80° C. for at least about 3 days, thereby forming large, plate-like crystals of sodium metaborate tetrahydrate, (e) separating said crystals from said solution by centrifugation at a temperature in the range of from about 54° to about 80° C., and (f) recycling said solution to form additional sodium metaborate.

10. The process according to claim 9, wherein said stirred solution is maintained at a temperature in the range of from about 60° to about 75° C. for about 6 to about 10 days.

11. The process according to claim 9, wherein additional sodium metaborate solution prepared according to steps a, b and c is slowly added to the slurry of large crystals of sodium metaborate tetrahydrate after step (d) while maintaining the temperature of the slurry in the range of from about 54° to about 80° C. and slowly removing an equal volume of the slurry of crystals at substantially the same rate as the addition of hot solution.

References Cited by the Examiner
UNITED STATES PATENTS

| | | | |
|---|---|---|---|
| 2,146,093 | 2/1939 | Ritchie et al. | 23—59 |
| 2,886,425 | 5/1959 | Seibert | 23—59 X |
| 3,000,700 | 9/1961 | Campbell | 23—59 |
| 3,002,810 | 10/1961 | Campbell | 23—59 |
| 3,032,405 | 5/1962 | Mitchell et al. | 23—59 |

OSCAR R. VERTIZ, *Primary Examiner.*

H. T. CARTER, *Assistant Examiner.*